Figure 1:

Sept. 15, 1953　　　C. M. BUTTNER　　　2,651,987
AIR-MOVING DEVICE

Filed July 17, 1950　　　　　　　　　　　　　　2 Sheets-Sheet 1

INVENTOR
Carl M. Buttner
BY
Ray Eilers
ATTORNEY

Sept. 15, 1953  C. M. BUTTNER  2,651,987
AIR-MOVING DEVICE
Filed July 17, 1950  2 Sheets-Sheet 2
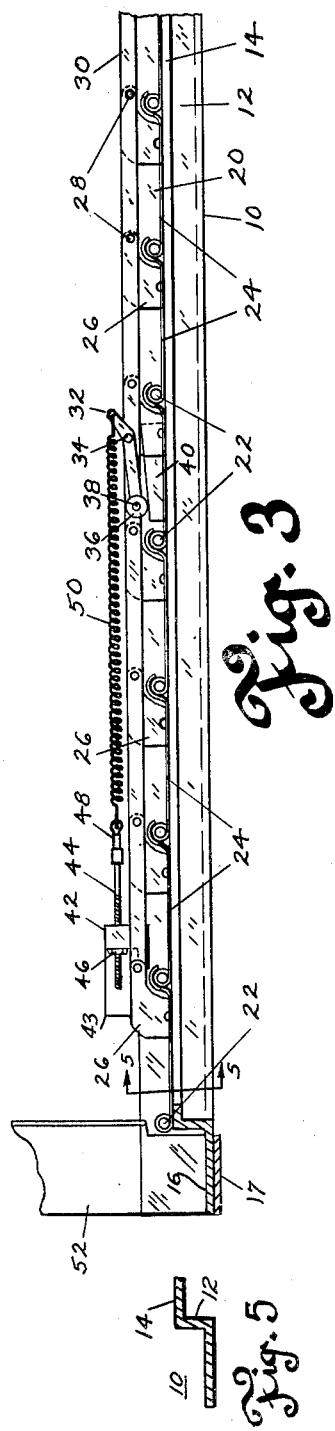
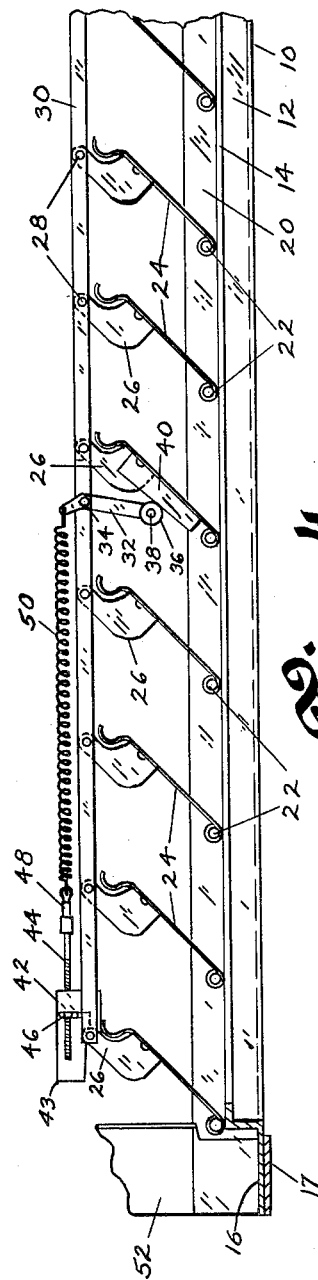
INVENTOR
Carl M. Buttner
BY
Ray Eilers
ATTORNEY Patented Sept. 15, 1953

2,651,987

UNITED STATES PATENT OFFICE 2,651,987

AIR-MOVING DEVICE

Carl M. Buttner, Memphis, Tenn., assignor to Hunter Fan and Ventilating Company, Memphis, Tenn., a corporation of Tennessee Application July 17, 1950, Serial No. 174,141

7 Claims. (Cl. 98—116)

This invention relates to improvements in air-moving devices. More particularly, this invention relates to improvements in louver-operating mechanisms for louvers that are adjacent air-moving devices.

It is therefore an object of the present invention to provide an improved louver-operating mechanism for louvers that are adjacent air-moving devices.

It is frequently desirable to set air-moving devices in or adjacent to openings in buildings or structures to facilitate the ventilating of those buildings or structures. While it is necessary that such openings be kept open whenever the air-moving devices are operating, it is usually necessary that such openings be kept closed at all other times. One method of accomplishing these results is to mount a number of louvers adjacent the openings; and this is usually done. The louvers can be moved to open position to permit ready flow of air to or from the air-moving devices, and they can be moved to closed position to prevent undesired ingress of air, dirt and water.

In many instances gravitational forces are relied upon to move the louvers to closed position while the air pressure generated by the air-moving device is relied upon to move the louvers to open position. However the air pressure generated by air-moving devices decreases so rapidly, after the louvers begin to move to open position, that the air pressure usually can not hold the louvers in fully opened position. To overcome this difficulty, many louvers have been equipped with springs that assist the movement of the louvers to open position. However, the opening forces of the springs decrease so rapidly, as the louvers begin to move to open position, that full opening of the louvers is not effected. Anything short of full opening is objectionable since it causes the louvers to restrict the flow of air to or from the air-moving device. For these reasons, prior louver-operating mechanisms that rely upon gravitational forces to close the louvers and that rely upon air-pressure and spring pressure, or air pressure alone, to open the louvers are objectionable. The present invention obviates these objections by providing a louver-operating mechanism wherein a rotatable lever applies the force of a spring to the louvers. This lever rotates relative to the louvers as they move toward and away from open or closed position, and in doing so it varies the force applied to the louvers by the spring. As a result, that lever offsets the reduction in force experienced by extension springs as they retract. In this way, the lever assures movement of the louvers to fully opened position. It is therefore an object of the present invention to provide a louver-operating mechanism which has a rotatable lever that applies the force of a spring to the louvers.

The spring in the louver-operating mechanism provided by the present invention moves bodily with the louvers as they move toward and away from open or closed position. In doing so that spring experiences less extension and retraction than do springs which have one end secured to the stationary frame of the louvers. Because it experiences only a very little extension and retraction, the spring provided by the present invention is enabled to supply a rather constant and uniform force. As a result, the louvers can be urged to fully open position by the spring. It is therefore an object of the present invention to provide a louver-operating mechanism which has a spring that moves bodily with the louvers.

It is desirable to apply strong opening forces to louvers whenever the air-moving devices adjacent those louvers are operating and yet it is desirable to minimize such lifting forces whenever the air-moving devices are not operating. The present invention satisfies these conditions by disposing the spring and lever of the louver-operating mechanism so the line of action of the spring is very close to the line between the pivot of the lever and the point of connection of lever and spring when the louvers are in closed position. This greatly reduces the opening forces on the louvers when the air-moving device is not operating. As soon as that air-moving device starts to operate, the louvers will respond to air pressure and start to open; and the opening movement of the louvers will cause the line of action of the spring and the line between the pivot of the lever and the connection between spring and lever to subtend a greater angle. This increases the effectiveness of the force of the spring, as applied to the louvers; and prompt and full opening of the louvers is thus assured. It is therefore an object of the present invention to provide a louver-operating mechanism wherein the line of action of the spring is close to the line between the pivot of the lever and the point of connection of spring and lever whenever the louvers are closed, and wherein that line of action and that line will subtend a greater angle when the louvers move toward open position.

The ability of the spring to apply constant and uniform forces to the louvers is further assured by having one end of the lever move along an inclined surface on one of the louvers. That surface will be disposed so the spring will experience a lesser retraction than it would in the absence of that surface, and the lesser retraction enables the spring to provide a more constant and uniform force to the louvers. It is therefore an object of the present invention to provide a louver-operating mechanism wherein one end of the lever moves along an inclined surface.

With the louver-operating mechanism provided by the present invention, the air pressure generated by the air-moving device is greatest when the louvers are closed and is least when those louvers are open; while the force applied by the spring and lever is least when the louvers are closed and is greatest when the louvers are open. This is very desirable because it enables the two sources of movement to complement each other and provide peak-free application of forces to the louvers.

It is desirable that louver-operating mechanisms have minimum overall height, because in many instances the louver-operating mechanisms must operate adjacent beams, joists or other elements of structures or buildings. The present invention minimizes the overall height of louver-operating mechanisms by mounting the operating parts thereof directly on the louvers or on the bar which connects those louvers together for conjoint movement. It is therefore an object of the present invention to provide a compact louver-operating mechanism wherein the operating parts are mounted directly on the louvers or on the bar which connects those louvers together for conjoint movement.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
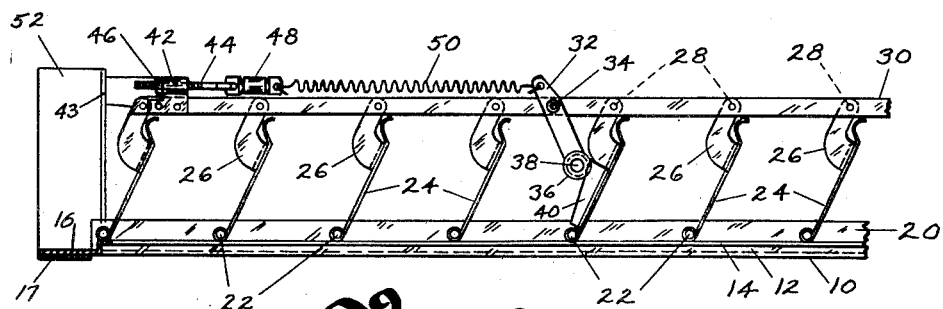

In the drawing, Fig. 1 is a plan view of a number of louvers and the louver-operating mechanism therefor which are made in accordance with the principles and teachings of the present invention, Fig. 2 is a partially-sectioned side elevational view of the louvers and louver-operating mechanism of Fig. 1, it is taken along the plane indicated by the line 2—2 of Fig. 1, and it shows those louvers and that louver-operating mechanism in fully opened position, Fig. 3 is an enlarged partially-sectioned, side elevational view of the louvers and louver-operating mechanism of Figs. 1 and 2, and it shows those louvers and that louver-operating mechanism in closed position, Fig. 4 is an enlarged partially-sectioned, side elevational view of the louvers and louver-operating mechanism of Figs. 1-3, and it shows those louvers and that louver-operating mechanism intermediate fully opened and fully closed positions, and Fig. 5 is a cross sectional view of one of the angles of the frame of the louver-operating mechanism of Figs. 1-4, and it is taken along the plane indicated by the line 5—5 of Fig. 3.

Referring to the drawing in detail, the numeral 10 denotes two longitudinally extending, spaced angles of the stationary frame of louvers which can be set adjacent an air-moving device, not shown. Each of these angles has an S-shaped configuration consisting of a main horizontally-disposed portion and a secondary offset horizontal section; the latter of the two sections being denoted by the numeral 14. A vertically extending section 12 is disposed between and connects the two horizontally disposed sections. The angles 10 are so disposed relative to each other that the offset horizontal portions 14 of those angles are directed toward each other. The numeral 16 denotes two transversely extending, spaced angles which are welded or otherwise suitably secured to the longitudinally extending angles 10. Each of the transversely extending angles 16 also has two horizontally directed portions connected together by a vertically extending section. The ends 17 of the transversely extending angles 16 are bent downwardly sufficiently to enable them to underlie the longitudinally extending angles 10 while the planes of the main horizontally disposed surfaces of the angles 10 and 16 are identical.

The numeral 18 denotes spaced angles, and those angles are located on the upper surfaces 14 of the longitudinally extending angles 10. The angles 18 act to stiffen the frames formed by the longitudinally and transversely extending angles 10 and 16. Disposed inwardly of the spaced angles 18 are longitudinally extending angles 20, and those angles rotatably support a number of spaced rods or shafts 22. These shafts extend transversely across the space defined by angles 10 and 16, and they are supported at each end by the angles 20. Each of shafts 22 carries a louver 24 solidly secured thereto. The free rotation of the shafts 22 relative to the angles 20 permits free rotation of the louvers 24 relative to those angles. The free ends of the louvers 24 are concave and are dimensioned so they can fit down over the ends of the louvers which are wrapped around the shafts 22. Such an arrangement enables the louvers, when in closed position, to effectively prevent passage of air through the space defined by the angles 10 and 16.

Each of the louvers 24 has a crank arm 26 secured thereto, and those crank arms project upwardly from the surfaces of those louvers. A pivot is provided for each of the crank arms 26, and those pivots are denoted by the numeral 28. The pivots extend into and are secured to a longitudinally extending connecting bar 30. This bar acts through the pivots 28 to connect all of the louvers 24 for conjoint movement to open or closed position.

A bent lever 32 is pivoted to the bar 30 by a pivot 34. The pivot 34 is located intermediate the ends of the bent lever 32 and is so disposed that the lower portion of the lever is considerably longer than the upper portion of the lever. The lower end of the lever 32 carries a wheel 36 which is secured to the lever 32 by a pivot 38. The wheel 36 can rotate freely relative to the lever 32 and it has a grooved periphery. The groove in the periphery of the wheel 36 is wide enough to telescope over and receive an inclined surface 40 secured to one of the louvers 24. The inclined surface 40 is shown as a trapezoid but it could have a number of different forms. The upper edge can be straight as shown in the drawing or it could be arcuate.

A bracket 42 is secured to the bar 30 and moves with that bar. A bolt 44 extends through the bracket 42 and is held against separation from that bracket by a nut 46 threaded onto the end thereof. The nut 46 not only holds the bracket 42 and bolt 44 in assembled relation, but it also adjusts the position of the bolt 44 relative to the bracket 42. A fusible link 48 is carried at the end of the bolt 44 and that fusible link supports one end of a spring 50. The other end of the spring 50 extends to and is held by the upper end of the bent lever 32. A stop 52 is secured to the transversely extending angle 16 at the left hand end of the frame and it is in register with a projecting end 43 of the bracket 42 on the bar 30. The stop 52 will limit movement of the bracket 42 and thus limit movement of the louvers 24 toward open position.

The frame defined by the angles 10 and 16 will normally be in a horizontal plane and at such time the louvers 24 will respond to gravitational forces to move toward closed position. Those louvers will, at such time, also be acted upon by the spring 50; that spring tending to rotate the lever 32 about the pivot 34 and thus provide a downwardly acting force on the said one louver 24 and an upwardly directed force on the bar 30. The upwardly directed force on the bar 30 will apply an upwardly directed force to each of the crank arms 26 and thus to the louvers 24, but that force will not be great enough to open those louvers when the air-moving device is not operating. It will be noted, by reference particularly to Fig. 3, that the line of action of the spring is close to the line from the pivot 34 to the point of connection between lever 32 and spring 50 whenever the louvers 24 are in closed position. This is desirable because it minimizes the lifting action on the louvers of the force applied by the spring. As the result, the edges of the louvers 24 will rest solidly on the horizontally disposed sections 14 of the angles 10 and also upon the arcuate portions of adjacent louvers 24 which surround the shafts 22. As a result, the louvers 24, when in closed position, provide such resistance to air flow through the space defined by the angles 10 and 16 that when the air moving device begins to operate a substantial difference in pressure is quickly established between the top and bottom surfaces of the louvers 24. This pressure urges the louvers upwardly around the shafts 22 and toward open position. This movement of these louvers enables air to pass from below to above the louvers and thus greatly reduce the differential in pressure between the top and bottom surfaces of the louvers and thus reduce the overall force acting upon the louvers to open them. However, as this happens, the bent lever will be moving to a position where the force applied on it by the spring more effectively urges the louvers 24 to open position. As the angle between the line of action of the spring and the line between the pivot 34 and the point of connection of lever 32 and spring 50 approaches ninety (90) degrees, the effectiveness of the force applied to the lever by the spring to urge the louvers toward open position becomes greater. As the lever 32 continues to rotate, its upper end will pass through the vertical and will continue to move toward the bracket 42, and eventually the angle between the line of action of the spring 50 and the line between pivot 34 and the point of connection of spring 50 and lever 32 will become so small that further movement of the louvers to open position will be resisted. The tension of the spring 50 and the inclination of the plate 40 will control the angle at which the louvers will come to rest under the conjoint action of gravitational forces and spring pressure and air pressure, but that angle will usually be between sixty-five (65) and seventy (70) degrees from the horizontal. As the lever 32 was rotating about the pivot 34, the wheel 36 was rolling upwardly along the inclined surface 40. As it did so, it maintained the tension of the spring 50 at a greater value than if the roller 36 was merely moving along the rear surface of that particular louver 24. By increasing the height of the higher end of the surface 40, it is possible to further reduce the loss of tension in the spring 50 as the louvers 24 move to open position.

The use of the inclined plane 40 serves a dual purpose. When the louvers 24 are closed, the lower end of the inclined surface holds the lever in a position where the angle between the line of action of the spring and the line from the pivot 34 to the point of connection of lever 32 and spring 50 is smaller than such angle would be without the inclined surface 40. As a result, the inclined surface 40 provides lesser opening forces on the louvers 24 when those louvers are in closed position. When the louvers 24 are in open position, the upper end of the inclined surface 40 provides a greater tension in the spring 50 than could be in that spring if the inclined surface 40 was not present. As the result, that inclined plane assures opening of the louvers 24 to a wider extent than would be the case if it were not present.

The disposition of the pivot 34 on bar 30 away from the pivot 28 for the one louver 24 enables the lever 32 to utilize the wheel 36 as an instantaneous center of rotation. As the result, when the spring 50 pulls on the upper end of the lever 32, a downward force is provided on the inclined surface 40 and an upward force is provided on the bar 30; the lever 32 instantaneously rotating about the wheel 36. As the lever rotates it will actually rotate about the pivot 34 but will always keep its instantaneous rotation about the wheel 36 until fully opened position of the louvers is attained.

It will be noted that the louver-operating mechanism is mounted directly on the louvers 24 and upon the bar 30. As the result, the overall height of the louver-operating mechanism is just slightly greater than the overall height of the louvers 24 when those louvers are in fully opened position. This provides a very compact construction which can be used closely adjacent joists, beams and other elements of support in structures and buildings.

The air pressure generated by the air-moving device will initiate the opening of the louvers 24 and the spring 50 and lever 32 will apply strong opening forces as the air pressure decreases. The forces applied by the spring 50 and lever 32 are sufficient to hold the louvers 24 open as long as the air-moving device is operating; the movement of air to or from the air-moving device providing a secondary force that helps the spring and lever hold the louvers 24 open. When the air-moving device ceases operation, gravitational forces will overcome the force applied by the spring 50 and lever 32 and the louvers 24 will return to closed position. The effect of the gravitational force on the louvers 24 will increase as those louvers approach fully closed position, and the force applied by the spring and lever 32 will decrease as the louvers 24 approach closed position, but the remaining air pressure due to the gradually decelerating air-moving device, will be at its maximum as the louvers 24 approach fully closed position and thus the louvers 24 will be kept from striking the horizontally disposed portions 14 of the angles 10 with undue force. As the air-moving device comes to rest, the gravitational force on the louvers 24 will be adequate to hold the louvers 24 tightly in closed position.

A fusible link 48 is secured to the end of the bolt 44 and it holds the left hand end of the spring 50. If a fire or if an undue amount of hot air occurs adjacent the air moving device, that fire or hot air will cause the fusible link 48 to soften and melt. The softening and melting of the fusible link 48 will free the spring 50 from the bolt 44 and remove the spring pressure from the louvers 24. If the louvers are in open position at the time the fusible link 48 softens and melts, those louvers will immediately move to closed position under the action of the gravitational forces. This is highly desirable since such movement would reduce drafts which might otherwise feed the fire. If the louvers 24 are in closed position when the fusible link 48 softens and melts, those louvers will remain in closed position even though the air-moving device is started. This is desirable because the starting of the air-moving device might otherwise feed the fire.

Whereas a preferred embodiment of the present invention is shown and described in the drawing and accompanying description it should be obvious to those skilled in the art that various changes may be made in the form of the invention without affecting the scope thereof.

What I claim is:

1. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotation relative to said frame, a plurality of crank arms secured to and projecting from said louvers, a bar, a second plurality of pivots securing said crank arms to said bar to provide conjoint movement of said louvers, a lever pivoted intermediate its ends to said bar, the pivot for said lever being adjacent to but spaced from the pivot for the crank arm of one of said louvers, an inclined surface on said one louver that is disposed intermediate the pivot for said one louver and the free edge of said one louver, a wheel that is rotatably secured to one end of said lever and bears against one end of said inclined surface on said one louver whenever said louvers are in closed position, said wheel being movable by rotation of said lever to the other end of said inclined surface when said louvers are in open position, said one end of said inclined surface being adjacent the pivot for said one louver and said other end of said inclined surface being adjacent the free edge of said one louver, said one end of said inclined surface being below the level of said pivot for said lever and below the level of said other end of said inclined surface whenever said louvers are in closed position, a spring which has one end thereof secured to said bar and has the other end thereof secured to the other end of said lever, said spring acting through said lever to apply a louver-closing force on said one louver and to apply a louver-opening force on said bar, the spacing between the pivot for said lever and the pivot for the crank arm of said one louver causing said lever to rotate as said louvers move toward and away from open and closed positions, said rotation of said lever varying the effectiveness of the forces applied by said spring to said bar and said one louver, said other end of said lever extending away from said one end of said spring whenever said louvers are in the closed position, said other end of said lever extending toward said one end of said spring whenever said louvers are in open position.

2. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotation relative to said frame, a plurality of crank arms secured to and projecting from said louvers, a bar, a plurality of pivots securing said crank arms to said bar to provide conjoint movement of said louvers, a lever pivoted intermediate its ends to said bar, the pivot for said lever being adjacent to but spaced from the pivot for the crank arm of one of said louvers, an inclined surface on said one louver that is disposed intermediate the pivot for said one louver and the free edge of said one louver, a wheel that is rotatably secured to one end of said lever and bears against one end of said inclined surface on said one louver whenever said louvers are in closed position, said wheel being movable by rotation of said lever to the other end of said inclined surface when said louvers are in open position, said one end of said inclined surface being adjacent the pivot for said one louver and said inclined surface extending transversely to the axis of said pivot for said one louver, said one end of said inclined surface being below the level of said pivot for said lever whenever said louvers are in closed position, a spring which has one end thereof secured to said bar and has the other end thereof secured to the other end of said lever, said spring acting through said lever to apply a louver-closing force on said one louver and to apply a louver-opening force on said bar, the spacing between the pivot for said lever and the pivot for the crank arm of said one louver causing said lever to rotate as said louvers move toward and away from open and closed positions, said rotation of said lever varying the effectiveness of the forces applied by said spring to said bar and said one louver, said other end of said lever extending away from said one end of said spring whenever said louvers are in closed position, said other end of said lever extending toward said one end of said spring whenever said louvers are in open position.

3. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotation relative to said frame, a plurality of crank arms secured to and projecting from said louvers, a bar, a second plurality of pivots securing said crank arms to said bar to provide conjoint movement of said louvers, a lever pivoted intermediate its ends to said bar, the pivot for said lever being adjacent to but spaced from the pivot for the crank arm of one of said louvers, an inclined surface on said one louver that is disposed intermediate the pivot for said one louver and the free edge of said one louver, one end of said louver engaging said inclined surface, a spring which has one end thereof secured to said bar and has the other end thereof secured to the other end of said lever, said spring acting through said lever to apply a louver-closing force on said one louver and to apply a louver-opening force on said bar, the spacing between the pivot for said lever and the pivot for the crank arm of said one louver causing said lever to rotate as said louvers move toward and away from open and closed positions, said rotation of said lever varying the effectiveness of the forces applied by said spring to said bar and said one louver, said other end of said lever extending away from said one end of said spring whenever said louvers are in closed position, said other end of said lever extending toward said one end of said spring whenever said louvers are in open position.

4. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotation relative to said frame, a plurality of crank arms secured to and projecting from said louvers, a bar, a plurality of pivots securing said crank arms to said bar to provide conjoint movement of said louvers, a lever pivoted intermediate its ends to said bar, the pivot for said lever being adjacent to but spaced from the pivot for the crank arm of one of said louvers, a bearing surface on said one louver, a wheel on one end of said lever that engages and rolls along said bearing surface on said one louver, a spring which has one end thereof secured to said bar and has the other end thereof secured to the other end of said lever, said spring acting through said lever to apply a louver-closing force on said one louver and to apply a louver-opening force on said bar, the spacing between the pivot for said lever and the pivot for the crank arm of said one louver causing said lever to rotate as said louvers move toward and away from open and closed positions, said rotation of said lever varying the effectiveness of the forces applied by said spring to said bar and said one louver, said other end of said lever extending away from said one end of said spring whenever said louvers are in closed position, said other end of said lever extending toward said one end of said spring whenever said louvers are in open position.

5. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotations relative to said frame, a bar connecting said louvers together for conjoint movement, a pivot in said bar that moves with said louvers as they move toward and away from open and closed positions, said pivot being adjacent one of said louvers, a lever rotatably supported by said pivot, an inclined surface mounted on said one louver, one end of said lever engaging said inclined surface with a sliding contact to apply forces to said one louver, and a spring that has one end secured to and acting upon said lever and has the other end thereof secured to said bar, said bar being movable with said louvers as they move toward and away from open and closed positions, said spring biasing said lever to rotate toward louver-opening position, said spring being strong enough to coact with air pressure exerted on said louvers by said air-moving device to move said louvers to open position but being weak enough so gravitational forces can move said louvers to closed position.

6. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers that are secured to said pivots for rotation relative to said frame, a bar connecting said louvers together for conjoint movement, a pivot in said bar that moves with said louvers as they move toward and away from open and closed positions, said pivot being adjacent one of said louvers, a lever rotatably supported by said pivot, a surface on said one louver, one end of said lever engaging said surface on said one louver to apply forces to said one louver, and a spring secured to and acting upon said lever, said spring biasing said lever to rotate toward said surface on said one louver and to exert forces on said surface and on said pivot in said bar and thereby urge said louvers to open position, said spring being strong enough to coact with air pressure exerted on said louvers by said air-moving device to move said louvers to open position but being weak enough so gravitational forces can move said louvers to closed position.

7. A louver-operating mechanism, that can be used with louvers which are positioned adjacent an air-moving device and that can coact with gravitational forces to move said louvers to closed position and can coact with air pressure generated by said air-moving device to move said louvers to open position, and that comprises a frame, a plurality of pivots carried by said frame, a plurality of louvers secured to said pivots for rotation relative to said frame, a plurality of crank arms secured to and projecting from said louvers, a bar, a second plurality of pivots securing said crank arms to said bar to provide conjoint movement of said louvers, a lever pivoted intermediate its ends to said bar, the pivot for said lever being adjacent to but spaced from the pivot for the crank arm of one of said louvers, a bearing surface on said one louver that is engaged by one end of said lever, a spring which has one end thereof secured to said bar and has the other end thereof secured to the other end of said lever, said spring acting through said lever to apply a louver-closing force on said bearing surface on said one louver and to apply a louver-opening force on said bar, the spacing between the pivot for said lever and the pivot for the crank arm of said one louver causing said lever to rotate as said louvers move toward and away from open and closed positions, said lever having its axis closely adjacent the line of action of said spring whenever said louvers are closed but having its axis spaced from said line of action whenever said louvers are open, whereby rotation of said lever varies the effectiveness of the forces applied by said spring to said bar and said bearing surface on said one louver.

CARL M. BUTTNER.

References Cited in the file of this patent

UNITED STATES PATENTS

| Number | Name | Date |
|---|---|---|
| 1,792,514 | Spear | Feb. 17, 1931 |
| 2,272,928 | Weaver et al. | Feb. 10, 1942 |
| 2,295,239 | Seator | Sept. 8, 1942 |
| 2,299,833 | Mader | Oct. 27, 1942 |
| 2,314,003 | Mader | Mar. 16, 1943 |